Patented June 15, 1926.

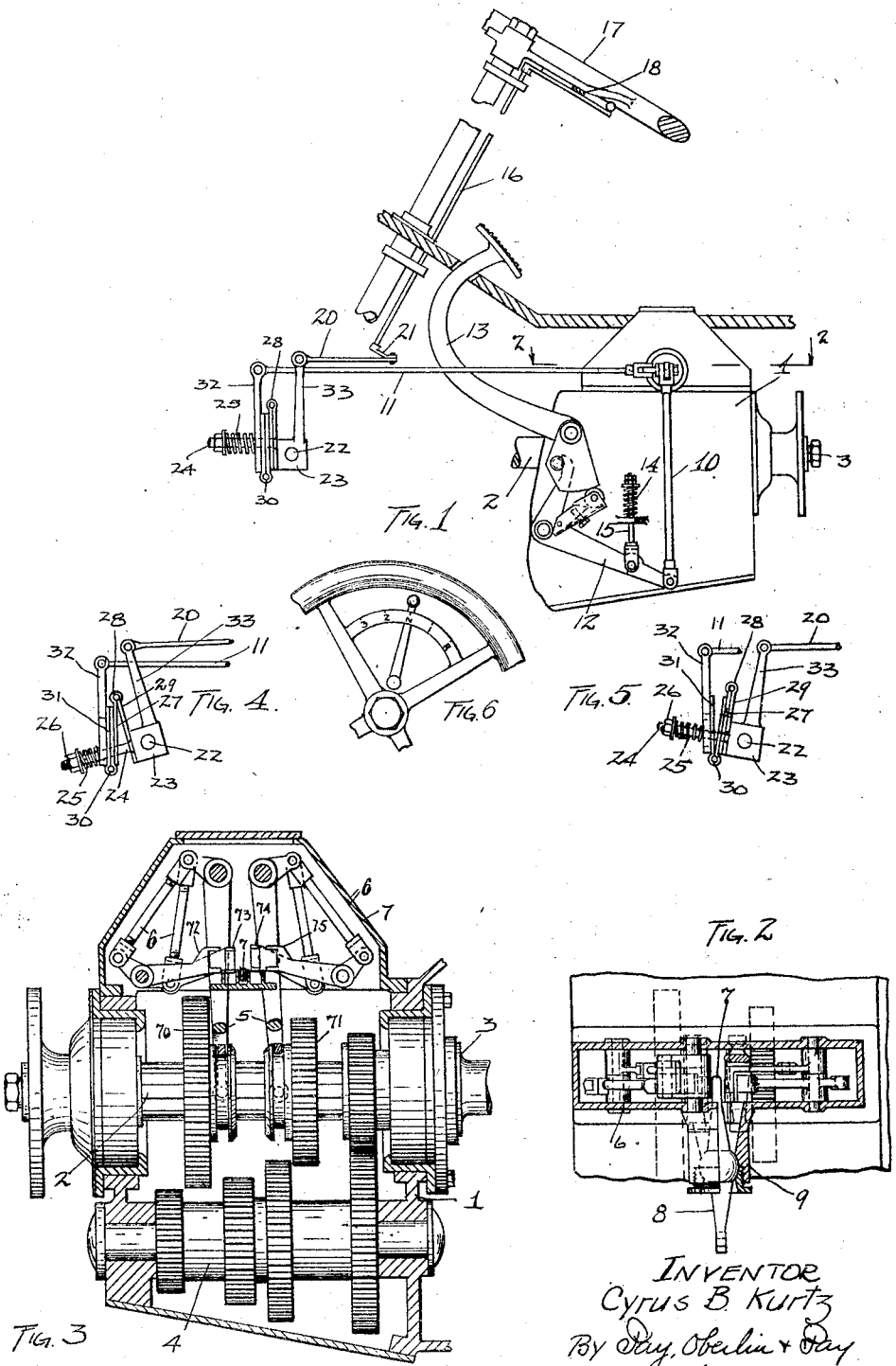

1,588,750

UNITED STATES PATENT OFFICE.

CYRUS B. KURTZ, OF CLEVELAND, OHIO.

TRANSMISSION-CONTROL MECHANISM.

Application filed July 31, 1919. Serial No. 314,544.

The present invention, relating, as indicated, to transmission control mechanism, is particularly directed to certain improvements of the type of transmission and control therefor which are described and claimed in my co-pending application Serial No. 282,008, filed March 11, 1918. In said application a sliding gear transmission of the type now in general use in motor vehicles is provided with a control mechanism comprising what may be termed a floating, operating and selecting lever mounted for selection by pivotal movement in one plane, and for operation by a pivotal movement in a series of planes at right angles to the first. In the mechanism therein described the single operating and selecting member is in the form of a ball lever, pivoted for this universal movement in planes at right angles to each other, the selecting movement being effected with little, if any, resistance to the operation, while the operating movement is the only one that requires any appreciable amount of force on the lever.

The present improvements relate to a means constructed as a part of such a controlling mechanism, which will permit of a preliminary selection of the specific gear to be engaged for operation before any movement occurs which really places the selected gear in operation and requires any force for the movement. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawings:—

Fig. 1 is a side elevation of a transmission mechanism in combination with the steering column of a vehicle showing my improved controlling means; Fig. 2 is a section on the line 2—2, Fig. 1, illustrating the construction of the ball lever constituting the selecting and operating member; Fig. 3 is a vertical section through said transmission showing the gear and controlling means in elevation; Figs. 4 and 5 are side views.

In Figs. 1 and 2, I have shown a transmission case 1 having aligned driving and driven shafts 2 and 3 disposed therein, which are adapted to be connected in the usual way by a series of slidable gears mounted either on the driving or driven shafts themselves, or on a counter-shaft 4, which is shown in Fig. 3. In the type of controlling mechanism employed for effecting the various gear changes the usual gear-shifting collars 5 are used, operation of which is effected by means of connecting links 6 which may be moved vertically upward or downward upon engagement and displacement by the inner ends 7 of the ball lever 8. The ball lever 8 is supplied with a central spherically formed portion which is universally mounted in an extension 9 of the case 1, extends externally thereof, and has its outer end connected to a vertical rod 10, and also to a longitudinal extending rod 11. The rod 10 is connected to one end of the bell crank lever 12, the other arm of which is moved upon the disengaging or downward movement of a clutch lever 13, while a spring 14 and rod 15 serve to normally position the bell crank lever 12 after displacement, and therethrough to force the inner end of ball lever 8 down, putting and retaining selected gear in mesh, or resting on stop as shown in neutral selected position, end 7, Fig. 3.

For selecting the gear-shifting yoke to be operated in order to engage the desired gear the rod 11 is connected, in a manner to be presently described, to the lower end of a rotatable rod or shaft 16, upon the upper end of which is attached a small, light hand-lever 17, which may be positioned opposite the various indicating positions along the quadrant 18. The two clutch collars 5 each control two various gear relations, since each can move one of the gears 70 and 71 in each of two directions to effect the different gear engagements which are usual in this type of mechanism. The two sets of links 6 each connect to one of the collar members 5, while the ends 72, 73, 74 and 75 of all the links are brought normally into the same horizontal plane for engagement of the ball lever end 7. No resistance to free horizontal movement in the plane of such link ends is offered, and thus the movement of the ball lever into position to engage and operate any one of the gear-shifting collars is affected.

The construction as so far described is identical with that of my co-pending application already referred to, in which the ball lever is freely movable in a horizontal plane to select a desired gear for engagement. There is no resistance tending to prevent movement of the ball lever in this plane, except the slight frictional resistance to the connections, and possibly some very slight added resistance on the quadrant 18 to hold the hand lever in a desired position.

At the lower end of the shaft 16 is mounted a lever 21 connected to a rod 20 mounted adjacent to the ball lever selecting rod 11. Mounted about a suitable shaft or stud 22 is a box or plate 23 having a rod or bolt 24 extending forwardly therefrom, and encircled by a coiled spring 25 held in position by a nut or similar means 26 on the end of the bolt. Attached to the face of the block 23, from which projects the bolt 24, is an upwardly extending plate 29 provided with a central aperture fitting about the bolt 24, and hinged at the point 28 to a second plate 27 extending downwardly. The plate 27 is hinged at its lower end at 30 to a third plate 31, which is formed as a part of a lever 32 connected to the rod 11 extending to the outer end of the ball lever. Each of the plates 27 and 31 are formed with central openings of larger size than the bolt 24, through which the bolt extends, while the spring 25 is under constant compression between the plate 31 and the nut 26. Attached to the block 23 is a lever 33, which is connected at its upper end to the rod 20.

The operation of my improved machine is as follows: Assume, for example, that the direct speed is engaged in the transmission case and that the operator expects that he will desire to shift to second speed. He shifts the hand lever 17 to the proper position on the quadrant 18, in this way swinging the lever 33, and the plate 29 attached to the block 23, about the axis 28 of this plate, and away from, and out of contact with, the normally contacting plate 27. The plate 27, the plate 31 and the rod 32 are held from movement because the upper end of the last-named rod is connected to the ball lever, and the ball lever is at that time locked in engagement with one of the shifting collars 5, and hence cannot be moved laterally. When it is necessary to actually make the desired shift from high speed to second speed the clutch is depressed, thus lifting the inner end of the ball lever into the neutral or selecting plane and rendering it free for lateral movement. The compression of the spring 25 in the preliminary pivotal movement of the plate 29 causes this spring to shift the freely movable end of the ball lever into a position for operating the shifting yoke, which will engage the second speed. Upon the re-engagement of the clutch the ball lever is rocked vertically downward through the lever 12 and rod 10, actuating the second speed-shifting yoke and engaging the second speed gears.

If the preliminary movement of the selecting lever 17 is in one direction along the quadrant 18 the action is as described, but if in the other direction, then instead of pivoting the plate 27 about its axis 28, the block 23, the plate 27 and the plate 29 are swung as a unit about the lower axis 30, giving, however, the same results in the immediate shifting of the ball lever upon the disengagement of the clutch lever and the freeing of the ball lever for lateral or selecting movement. These two actions are shown in Figs. 4 and 5.

By means of this improved mechanism I provide for a preliminary selection of the speed to be next engaged, but this does not affect the action of the mechanism if it is desired to select and engage a speed only after the clutch has been released. In that case the hand lever 17 need not be moved until after the clutch has been released, when it may be moved to bring the ball lever to the desired position. During this action the spring 25 or the spring 45 in the device of Fig. 4 will serve to keep the parts in their proper relation since there is almost no resistance to movement on the part of the ball lever and the very slight normal compression of the spring will be sufficient to overcome the slight frictional resistance of the connections.

Fig. 6 shows a plan view of the quadrant and controlling lever 17 illustrating the various positions of the controlling lever. Each position of this lever will cause the engagement of the various gear means described in the transmission, and the Figures 3, 2, N, 1 and R appearing on the quadrant indicate respectively the third or high speed, second speed, neutral, first and low speed and reverse.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination with a selective sliding gear transmission having a plurality of shiftable sliding gears, a single oscillatory selecting and operating member therefor, and a clutch operating member connected to said member to effect a selected gear connection upon movement thereof, said gear selecting and operating member being freely movable for selection, but operable to effect a gear connection only upon engagement movement of said clutch operating member and being locked against selecting movement during the engagement of said clutch; of means operable independently of the gear selecting and operating member during such locked condition of said member and adapted to automatically effect a desired selecting movement of said member upon disengagement of said clutch operating member, said means comprising an oscillatory member, a pivoted arm connected thereto, and spring means connecting said arm to said selecting and operating member.

2. The combination with a selective sliding gear transmission having a plurality of shiftable sliding gears, a single oscillatory selecting and operating member therefor, and a clutch operating member connected to said member to effect a selected gear connection upon movement thereof, said gear selecting and operating member being freely movable for selection, but operable to effect a gear connection only upon engagement movement of said clutch operating member and being locked against selecting movement during the engagement of said clutch; of means operable independently of the gear selecting and operating member during such locked condition of said member and adapted to automatically effect a desired selecting movement of said member upon disengagement of said clutch operating member, said means comprising an oscillatory member, a pivoted arm connected thereto, a double hinged connection between said arm and said selecting and operating member and a spring adapted to tension said hinged connection upon movement of said oscillatory member.

Signed by me, this 21st day of July, 1919.

CYRUS B. KURTZ.